(12) United States Patent
Hori (10) Patent No.: US 11,936,832 B2
(45) Date of Patent: Mar. 19, 2024

(54) CONTROL METHOD FOR APPARATUS, PRINTING APPARATUS, AND STORAGE MEDIUM

(71) Applicant: CANON KABUSHIKI KAISHA, Tokyo (JP)

(72) Inventor: Daisuke Hori, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/726,711

(22) Filed: Apr. 22, 2022

(65) Prior Publication Data
US 2022/0353386 A1 Nov. 3, 2022

(30) Foreign Application Priority Data
Apr. 28, 2021 (JP) ................................. 2021-076106

(51) Int. Cl.
*H04N 1/54* (2006.01)
*H04N 1/60* (2006.01)
(52) U.S. Cl.
CPC ............. *H04N 1/54* (2013.01); *H04N 1/6008* (2013.01); *H04N 1/603* (2013.01)
(58) Field of Classification Search
CPC ......... H04N 1/54; H04N 1/6008; H04N 1/603
USPC ................................................ 358/1.9, 1, 15
See application file for complete search history.

(56) References Cited

U.S. PATENT DOCUMENTS

| 2004/0174548 A1* | 9/2004 | Ono ....................... H04N 1/603 358/1.9 |
| 2018/0239282 A1 | 8/2018 | Sakai |
| 2020/0081669 A1 | 3/2020 | Kunimi et al. |

FOREIGN PATENT DOCUMENTS

| EP | 3 726 826 A1 | 10/2020 |
| JP | 2016-103695 A | 6/2016 |

OTHER PUBLICATIONS

European Search Report dated Sep. 20, 2022, in European Patent Application No. 22170179.0.

* cited by examiner

*Primary Examiner* — Quang N Vo
(74) *Attorney, Agent, or Firm* — VENABLE LLP (57) ABSTRACT

A control method for an apparatus to control print data obtains color information to be printed in a specific color from the print data, detects a specific location to be printed in the specific color based on the obtained color information, and performs first color conversion to subject the color information included in the print data in accordance with a color conversion instruction. Second color conversion is performed on image data subjected to the first color conversion to turn color information corresponding to the specific location back to color information indicating the specific color before the first color conversion is performed, and a printing unit prints on the specific location by using the second color based on the color information indicating the specific color turned back and prints on a location other than the specific location by using the first color based on color information after the first color conversion.

16 Claims, 9 Drawing Sheets

```
400 ─┌─────────── XXX Printer PRINT SETTING ───────────┐
     │                                                   │
401 ─│  PAPER TYPE :    [COATED PAPER     ▽]            │
402 ─│  PAPER SIZE :    [A3               ▽]            │
403 ─│  PRINT QUALITY : [STANDARD         ▽]            │
     │                                                   │
     │  SPOT COLOR PRINTING : ☑ FLUORESCENT PINK (RGB: 0xFF, 0x00, 0xFF) ── 404
     │                        ☐ FLUORESCENT ORANGE (RGB: 0xFF, 0x55, 0x00) ── 405
     │  ─────────────────────────────────────           │
406 ─│  COLOR MATCHING : ☑                              │
     │           INPUT PROFILE :  [AdobeRGB       ▽] ── 407
     │           OUTPUT PROFILE : [Coated Paper01 ▽] ── 408
     │           MATCHING METHOD :[PERCEPTUAL     ▽] ── 409
     │  ─────────────────────────────────────           │
410 ─│  COLOR ADJUSTMENT : ☐   BRIGHTNESS : [+10 ⇅] ── 411
     │                         CONTRAST :   [ -5 ⇅] ── 412
     │                                                   │
     │                              [ OK ]   [CANCEL]   │
     └──────────────────────────────────┬───────┬──────┘
                                       413     414
```

|     | ORIGINAL COLOR OF OBJECT | | |
| --- | --- | --- | --- |
|     | R | G | B |
| 601 | 255 | 0 | 255 |
| 602 | 255 | 255 | 255 |
| 603 | 255 | 20 | 255 |
| 604 | 255 | 100 | 0 |
| 605 | 255 | 255 | 100 |

FIG.7A

|     | COLOR AFTER COLOR MATCHING | | |
| --- | --- | --- | --- |
|     | R | G | B |
| 601 | 230 | 0 | 230 |
| 602 | 255 | 255 | 255 |
| 603 | 255 | 0 | 255 |
| 604 | 240 | 90 | 0 |
| 605 | 240 | 240 | 80 |

FIG.7B

|     | COLOR TO BE TRANSMITTED TO IMAGE OUTPUT DEVICE | | |
| --- | --- | --- | --- |
|     | R | G | B |
| 601 | 255 | 0 | 255 |
| 602 | 255 | 255 | 255 |
| 603 | 254 | 0 | 254 |
| 604 | 240 | 90 | 0 |
| 605 | 240 | 240 | 80 |

CONTROL METHOD FOR APPARATUS, PRINTING APPARATUS, AND STORAGE MEDIUM

BACKGROUND OF THE INVENTION

Field of the Invention

The present invention relates to a control method, a printing apparatus, and a storage medium for executing printing by using process colors and a specific color that is different from the process colors.

Description of the Related Art

A technique for carrying out printing by using ordinary coloring materials such as cyan, magenta, yellow, and black coloring materials used in process color printing and also a coloring material of a specific color different from the ordinary coloring materials has been developed in the recent years.

Japanese Patent Laid-Open No. 2016-103695 discloses a printing technique designed to form an image by using a coloring material of a prescribed specific color into an image of process colors using coloring materials of basic colors.

SUMMARY OF THE INVENTION

In the course of forming an image by using a coloring material of a prescribed specific color into an image formed from coloring materials of ordinary colors, color conversion processing such as color matching and color adjustment may be sometimes carried out. There has been a demand for a technique for properly conducting printing by using the coloring material of the specific color even in the case of carrying out the above-mentioned color conversion processing.

Given the circumstances, it is an object of the present invention to provide a printing technique that enables proper conduct of printing in a specific color even in the case of carrying out color conversion processing.

A aspect of the present invention is a control method for an apparatus configured to control print data for executing printing by using a first color being a process color and a second color being a specific color different from the process color, including: obtaining color information to be printed in the specific color out of color information included in the print data; detecting a specific location to be printed in the specific color based on the obtained color information in an image; and performing first color conversion to subject the color information included in the print data to color conversion processing in accordance with a color conversion instruction, in which a printing unit configured to execute printing based on the print data executes the printing on the specific location by using the second color in accordance with a print instruction involving the specific color and the color conversion instruction, and to execute the printing on a location other than the specific location by using the first color based on color information after the color conversion in performing first color conversion.

According to the present invention, it is possible to conduct printing in a specific color properly even in the case of carrying out color conversion processing.

Further features of the present invention will become apparent from the following description of exemplary embodiments with reference to the attached drawings.

DESCRIPTION OF THE EMBODIMENTS

Embodiments of the present invention will be described below in detail with reference to the accompanying drawings. Note that the following embodiments are not intended to limit the scope of the present invention as defined in the appended claims. It is to be also understood that a solution according to the present invention does not always require a combination of all of the features described in any of the embodiments.

First Embodiment

Figure 1:
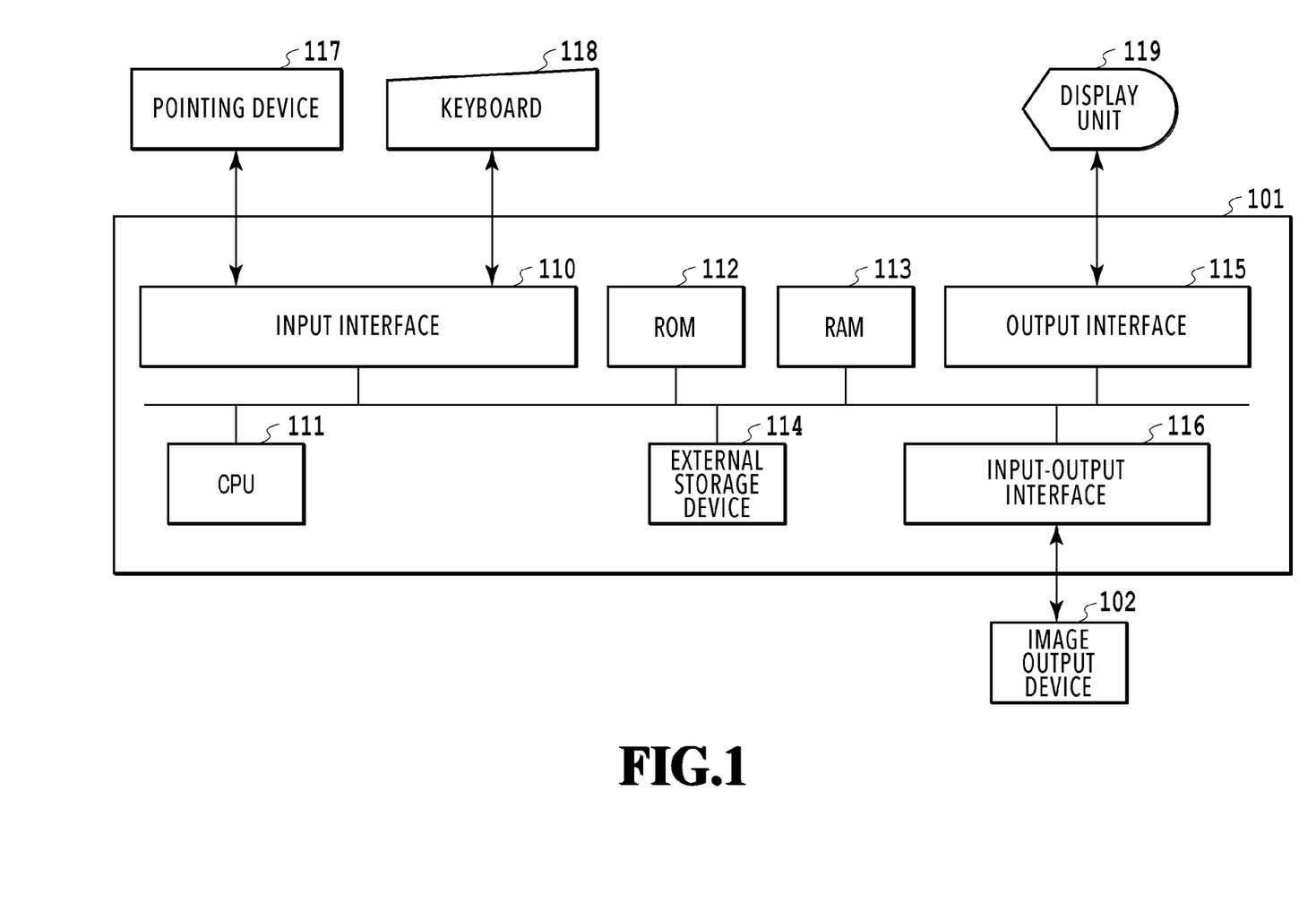
FIG. 1 is a block diagram showing a hardware configuration of a printing system according to an embodiment of the present invention.

A printing control apparatus according to a first embodiment of the present invention will be described. FIG. 1 is a block diagram showing a hardware configuration of a printing system according to the present embodiment. The printing system is formed from a host computer 101 and an image output device (printing apparatus) 102. The host computer 101 is an example of an information processing apparatus, which includes an input interface 110, a CPU 111, a ROM 112, a RAM 113, an external storage device 114, an output interface 115, and an input-output interface 116. Meanwhile, input devices such as a keyboard 118 and a pointing device 117 are connected to the input interface 110, and a display device such as a display unit 119 is connected to the output interface 115.

The CPU 111 controls the entire host computer 101 serving as the information processing apparatus by carrying out processing in accordance with procedures of programs stored in the ROM 112, and executes processing concerning functions to be described later and flowcharts to be described later. An initialization program is stored in the ROM 112. A group of application programs, an operating system (OS), a printer driver, and other various data are stored in the external storage device 114. The RAM 113 is formed from a static random access memory (SRAM), a dynamic random access memory (DRAM), or the like which requires a backup power supply. Here, the RAM 113 may retain data by using a not-illustrated primary battery for data backup. In this case, the RAM 113 can store data such as program control variables without causing volatilization thereof. Moreover, the RAM 113 is provided with a memory area for storing setting information on the host computer 101, management data, and the like. Furthermore, the RAM 113 is used, for example, as a main memory of the CPU 111, a work memory in executing various programs stored in the external storage device 114, and the like.

The image output device 102 is connected to the host computer 101 through the input-output interface 116. Here, the host computer 101 and the image output device 102 are separately provided. However, these structures may be integrated into a single information processing apparatus instead. Although an ink jet printer configured to execute printing by ejecting inks (coloring materials) onto a surface of a print medium will be described as an example of the image output device 102 in the present embodiment, the printing may be executed in accordance with a different method (such as an electrophotographic method).

Meanwhile, the present embodiment will describe the example of the ink jet printer configured to execute printing by using inks of ordinary colors and inks of specific colors (spot color inks) which will be explained below. In the meantime, the host computer 101 may be any of a desktop personal computer, a notebook personal computer, and a smartphone.

<Configuration of Printing System>

Figure 2:
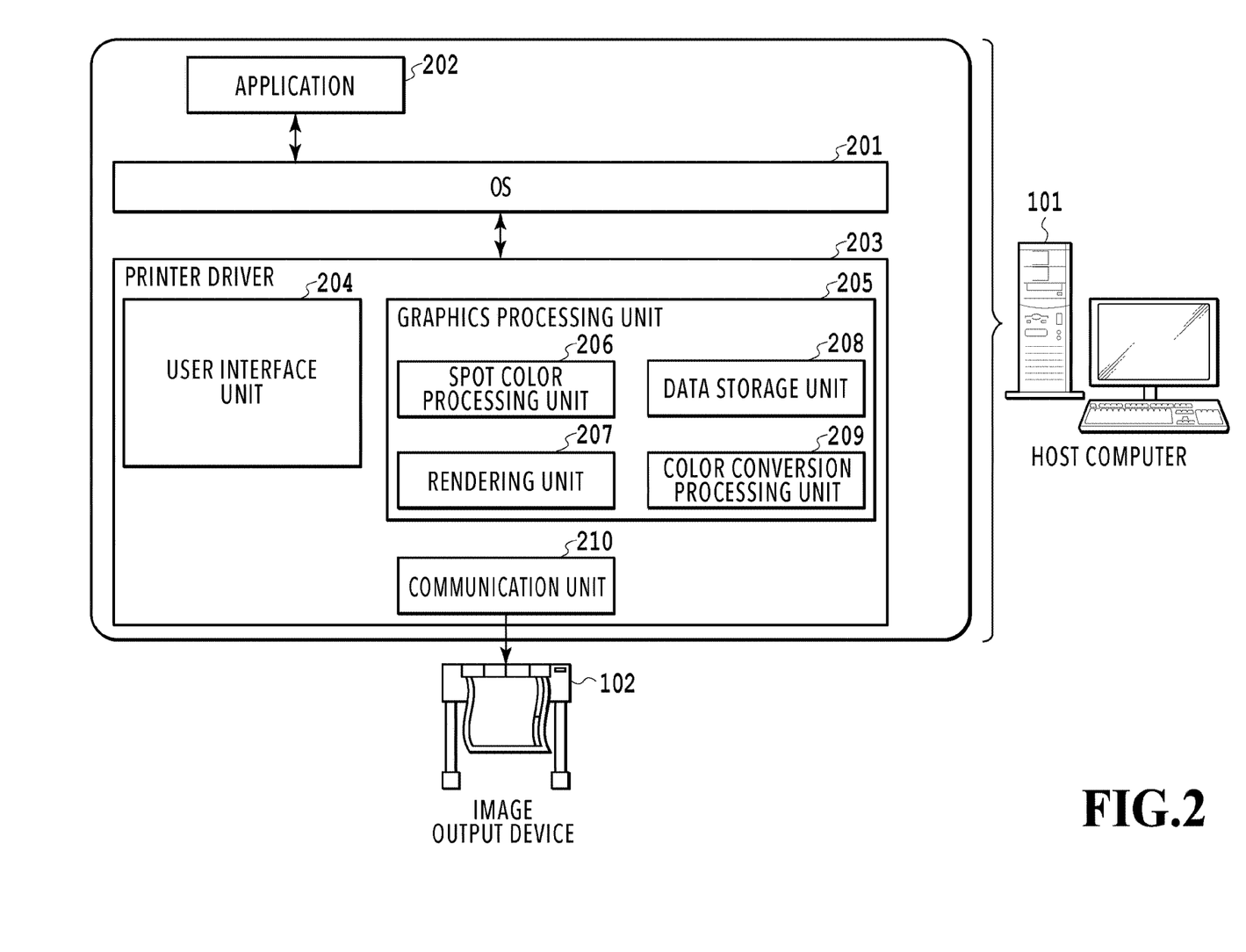
FIG. 2 is a block diagram schematically showing a configuration of the printing system that carries out spot color printing.

FIG. 2 is a block diagram schematically showing a configuration of a printing system that performs spot color printing based on a general application. The spot color printing is a printing mode that uses an ink of a special color (a spot color ink) other than ordinary inks. Moreover, the "ordinary inks (first coloring materials)" are inks used for performing process color printing, which are the inks of colors forming a basis of a process color, such as cyan (C), magenta (M), yellow (Y), and black (K) inks. Here, the process color is a color expressed either by one of the CMYK colors or by a combination of two or more colors of the CMYK colors. In the meantime, a fluorescent pink ink and a fluorescent orange ink are used as spot color inks (second coloring materials) in the present embodiment. A spot color is a color that is different from the process color, which cannot be expressed only with one of the CMYK colors or a combination of two or more colors of the CMYK colors. However, the present invention is not limited only to this configuration and the number and colors of the spot color inks may be arbitrarily determined, and an ink of a color which is not a fluorescent color is also applicable. For example, a violet ink, a green ink, an orange ink, a gold ink, a silver ink, or the like may be used as the spot color ink. Meanwhile, inks of other metallic colors are also applicable. In addition, an ink prepared by mixing a special color ink with another ink (such as an ordinary ink) may also be treated as the special color ink.

An application 202 is software that creates contents to be printed. For example, an image editing application to create poster data corresponds to the application 202. A user designates RGB values indicating the after-mentioned specific color on the application 202 concerning characters and graphic image data for which the user wants to carry out the spot color printing. Upon receipt of a print request from the user, the application 202 issues a print instruction to an OS 201. Upon receipt of the print instruction, the OS 201 assigns an OS printing system (not shown) included in the OS 201 to perform processing concerning the subsequent printing. The following description will be given on the assumption that the OS printing system carries out actions in cooperation with a printer driver 203 provided by a vendor of the image output device.

Upon receipt of a request for displaying a print setting screen from the application 202, the OS printing system requests the printer driver 203 to display a print setting screen, and the printer driver 203 displays the print setting screen on a user interface unit 204. Although the print setting screen will be described later, a size, a type, and the like of paper used as a print medium can be designated on the print setting screen and the spot color printing can also be designated thereon.

In the case of executing the spot color printing, the user selects the spot color ink to be used in the print setting screen displayed by the printer driver 203 to begin with. Then, the user creates contents on the application 202, and designates RGB data values corresponding to the use of the above-mentioned spot color ink to characters and graphic print data for which the user wants to use the spot color ink.

After completion of the print setting, the user instructs the application 202 to execute the printing by pressing a print button on the application 202. In response to the print instruction from the user, the application 202 creates print data and transmits the print data to a graphics processing unit 205 of the printer driver 203 through the OS 201.

The graphics processing unit 205 includes a spot color processing unit 206, a rendering unit 207, a data storage unit 208, and a color conversion processing unit 209. Although details of processing will be described later, the spot color processing unit 206 executes processing concerning the spot color printing, the rendering unit 207 executes rendering from the print data to RGB data, and color conversion processing unit 209 executes processing including color conversion such as color matching. The data storage unit 208 performs processing to temporarily store data after rendering into a storage medium such as an HDD. Meanwhile, the graphics processing unit 205 converts the print data into a data format interpretable by the image output device 102 after executing the spot color print processing, the color conversion processing, and the like, and transmits the print data to the image output device 102 through a communication unit 210. Thereafter, the inks are ejected from a print head to a paper sheet fed to the image output device 102, and an image is formed thereon.

The image output device 102 of the present embodiment includes a mechanism configured to eject the spot color ink to a location having the RGB values indicating the specific color in the case where the spot color printing is set by using the printer driver 203. Specifically, in the case where the spot color printing is set by using the printer driver 203, pixels in the print data having the specific RGB values corresponding to the set spot color are printed by using the spot color ink. It is possible to use one type or two or more types of the inks as the spot color ink. The following description will be given of the example of the image output device (the ink jet printer) 102, which includes a structure that can execute the printing by using two types of spot color inks of fluorescent pink and fluorescent orange as well as ordinary inks of four colors (CMYK).

The specific RGB values corresponding to the spot color are R=255 (0xFF), G=0 (0x00), and B=255 (0xFF), for example. The pixels having the corresponding RGB values are printed in a fluorescent pink color by using the fluorescent pink ink. In another case, the specific RGB values are R=255 (0xFF), G=85 (0x55), and B=0 (0x00), for example. The pixels having the corresponding RGB values are printed in a florescent orange color by using the fluorescent pink ink mixed with the magenta ink and the yellow ink. Here, in a case where the image output device 102 includes a structure that can use a fluorescent orange ink as the spot color ink, for example, then the printing in the fluorescent orange color may be carried out by using the ink of the orange color only.

Specifically, the pixels having the specific RGB values corresponding to the spot color only need to be printed by using at least the spot color ink, and may be or may not be printed by using the ink obtained by mixing the spot color ink with any of the CMYK inks.

Note that the pixels not having the specific RGB values corresponding to the spot color are printed by using the CMYK inks only even in the spot color printing. In the meantime, the spot color printing is executed in the case where the spot color printing is activated by a user operation. In other words, if a spot color print setting is not activated, then the pixels having the specific RGB values corresponding to the spot color are printed by using the CMYK inks only with reference to the RGB values as usual. Now, a specific description will be given of procedures in the case of performing the spot color printing.

<Creation of Spot Color Print Data>

In the case of executing the spot color printing, the user creates a content on the application 202 to begin with. Then, the user designates the specific RGB data values corresponding to the spot color ink to characters or a specific region on the graphic image in the created content, which the user wants to print by using the spot color ink.

Figure 3:
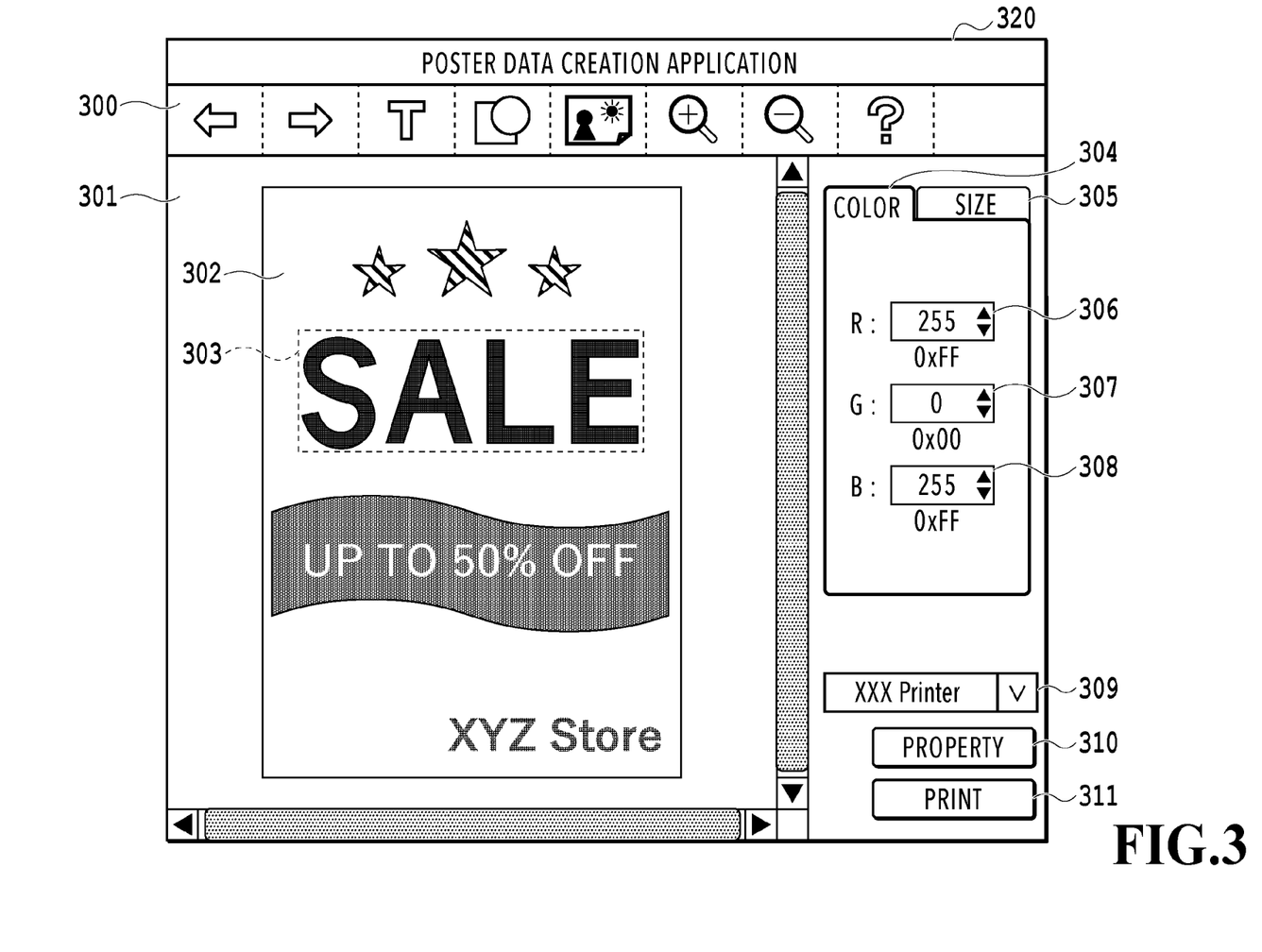
FIG. 3 is a diagram showing an example of a screen of a poster data creation application.

FIG. 3 is a diagram showing an example of a screen of a poster data creation application 320 in the application 202. This poster data creation application 320 is provided with toolbar buttons 300, an image data display region 301, an image data editing region 302, and an object selecting frame 303. In addition, the poster data creation application 320 is provided with an object color editing tab menu 304, an object resizing tab menu 305, a printer selection combo box 309, a printer property button 310, and a print button 311.

The toolbar buttons 300 enable selection of application functions. In this example, it is possible to select application functions such as cancellation and redoing of an editing operation, creation of a text object, creation of a graphic object, creation of an image data object, change of a display magnification, and display of help for the application.

Meanwhile, the image data display region 301 is a region to display image data created by the user. The image data editing region 302 is a region to enable the user to select an arbitrary object, to move the selected object, and to edit the image data by using the pointing device 117 (FIG. 1). The object selecting frame 303 is a display frame formed from a dashed line, which shows a selected object to the user in the case where the user selects the relevant object. In the example shown in FIG. 3, selection of a text object stating "SALE" is shown in the object selecting frame 303.

In the case where the object color editing tab menu 304 is selected, a control item is displayed for changing a color of the object that is currently selected. Meanwhile, in the case where the object resizing tab menu 305 is selected, a control item is displayed for changing the size of the currently selected object. In the example shown in FIG. 3, the object color editing tab menu 304 is selected and an R value change control item 306, a G value change control item 307, and a B value change control item 308 are displayed for changing the RGB values of the object.

Each control item for the R value, the G value, and the B value can set a value from 0 to 255 by directly inputting a value with the keyboard 118 or selecting a button on the right side of each control item with the pointing device 117. Meanwhile, the inputted value is also indicated below each control item in a hexadecimal number. In the example shown in FIG. 3, the RGB values of the text object stating "SALE" surrounded by the object selecting frame 303 are set to R=255 (0xFF), G=0 (0x00), and B=255 (0xFF) for designating fluorescent pink in the present embodiment.

In the present embodiment, a data creation color space of the application 202 may be set to an sRGB color space that stands for a standard RGB color space, or may be set to other color spaces such as an Adobe RGB color space. Moreover, it is also possible to set the data creation color space by using a CMYK color space besides the RGB color space, for example. In this case, the spot color is designated by using specific CMYK values. Meanwhile, in the case of setting the spot color in a color space other than the sRGB color space, it is necessary to conduct color conversion processing from a color space of inputted data into either the color space processed by the image output device 102 or the sRGB color space processed by the printer driver. Here, a problem that the specific RGB values (or the specific values of a different color space) for designating the spot color are altered in the middle may occur in this case. The present embodiment solves this problem by the processing to be described later.

Note that the printer selection combo box 309 is a control item for selecting the printer driver 203 to be used for the printing. The printer property button 310 is a button used for activating the print setting screen of the printer driver 203 designated in the printer selection combo box 309 for conducting a variety of print settings. The print button 311 is a button for transmitting the print data that includes the print setting set by using the printer property button 310 and the image data edited by the user to the printer driver 203 designated in the printer selection combo box 309.

<Configuration of Print Setting Screen>

Figure 4:
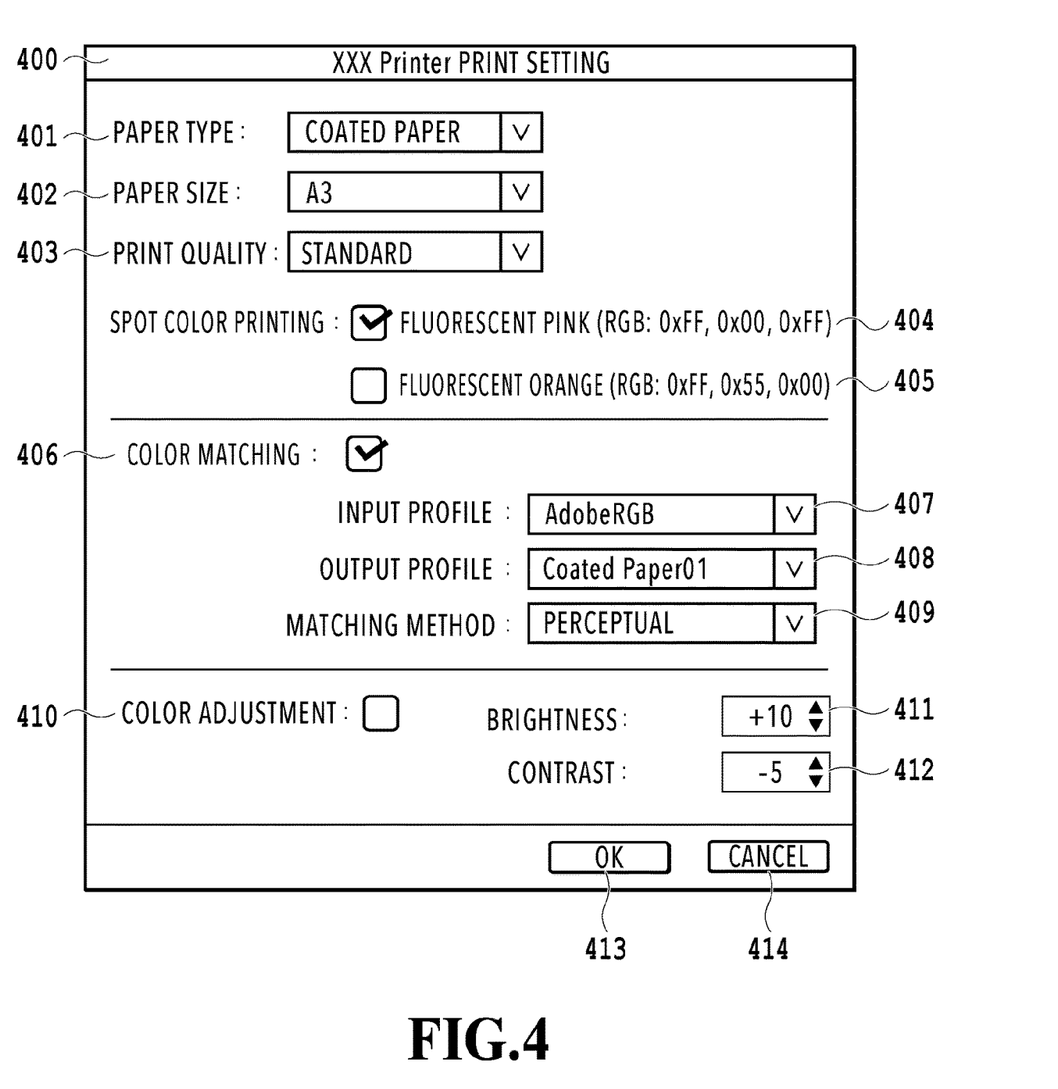
FIG. 4 is a diagram showing an example of a print setting screen.

FIG. 4 is a diagram showing an example of the print setting screen to be displayed on the user interface unit 204 (FIG. 2) in the case of pressing the printer property button 310. The user can obtain a desired print product from the image output device 102 by carrying out a variety of the print settings on a print setting screen 400.

The print setting screen 400 is provided with a paper type combo box 401, a paper size combo box 402, a print quality combo box 403, and check boxes 404 and 405 dedicated for the spot color printing. Moreover, the print setting screen 400 is provided with a color matching check box 406, an input profile combo box 407, an output profile combo box 408, and a matching method combo box 409. Furthermore, the print setting screen 400 is provided with a color adjustment check box 410, a brightness adjustment control item 411, a contrast adjustment control item 412, an OK button 413, and a cancel button 414.

The paper type combo box 401 is a control item for selecting one of types of paper such as plain paper, glossy paper, and coated paper from a list, which are acceptable to the image output device 102. The paper size combo box 402 is a combo box for a paper size, which is a control item for selecting one of the sizes of paper such as A4 and A3 from a list, which are printable with the image output device 102. The print quality combo box 403 is a combo box for print quality, which is a control item for selecting one of print quality modes such as a fast mode, a standard mode, and a high mode from a list, which are applicable in the case of printing with the image output device 102.

The check boxes 404 and 405 dedicated for the spot color printing are check boxes for designating the spot color. In the case where one of the check boxes 404 and 405 is on, the pixels included in the print data and having the RGB values equal to the RGB values set to one of the check boxes 404 and 405 are subjected to printing by using the corresponding spot color ink. In the present embodiment, the spot color printing by using fluorescent pink is carried out in the case where the check box 404 is on, while the spot color printing by using fluorescent orange is available in the case where the check box 405 is on. On the other hand, no spot color inks are used in the case where the check boxes 404 and 405 are off. Specifically, even in the case where the RGB values of the pixels included in the print data are equal to the RGB values set to any of the check boxes 404 and 405, an image representing the relevant RGB values is formed by using the ordinary inks for carrying out the process color printing of CMYK and the like. No spot color inks are used in this case.

The color matching check box 406 is a check box used for issuing an instruction (a color conversion instruction) as to whether or not it is appropriate to subject color information in the image data to color matching serving as the color conversion processing. In the case where this color matching check box 406 is on, the color matching is executed by the color conversion processing unit 209 in the graphics processing unit 205 of the printer driver 203 (FIG. 2). On the other hand, the color matching is not executed in the case where the color matching check box 406 is off.

The input profile combo box 407 is a control item for selecting a color space of input data such as sRGB, Adobe RGB, and CMYK from a list. The output profile combo box 408 is a combo box for an output profile, which is a control item for selecting one of dedicated profiles indicating color spaces that the image output device 102 can express on the paper serving as a print target. Meanwhile, the matching method combo box 409 is a control item for selecting one of matching methods such as a "perceptual" method, a "saturation" method, a "relative colorimetric" method, and an "absolute colorimetric" method from a list.

The user sets the respective boxes as shown in FIG. 4 in the case where the user wants to print the data created based on the Adobe RGB color space on the coated paper, for example. Specifically, the user sets "on" to the color matching check box 406. Then, the user sets "Adobe RGB" to the input profile combo box 407, and sets an output profile (coated paper 01) corresponding to the coated paper to the output profile combo box 408. In addition, the user sets "perceptual" to the matching method combo box 409.

In the case where the printing is executed in the state of setting as mentioned above, the color conversion processing unit 209 executes color conversion (color matching) from the input to the output corresponding to the values set by using the color conversion processing unit 209 itself or a color management module (CMM) installed in the OS. This makes it possible to execute the printing without causing tint deviation even in the case where the color space of the input data is different from the color space that the image output device 102 can express. Although FIG. 4 shows the example of setting the "perceptual" method to the matching method, the matching method can be set freely depending on the user's taste or the data type.

Regarding the color adjustment check box 410, color adjustment processing is executed by the color conversion processing unit 209 of the printer driver in the case where this check box is on. The brightness adjustment control item 411 is a control item for changing brightness of a print product, which can be set by directly inputting a value in the combo box with the keyboard 118 or selecting a button on the right side of the combo box with the pointing device 117. Reference numeral 412 denotes the contrast adjustment control item for changing contrast of the print product, which can be set by directly inputting a value with the keyboard 118 or selecting a button on the right side of the control item with the pointing device 117.

FIG. 4 shows an example in which the user sets the brightness of the print product to "+10" and the contrast thereof to "−5" while setting the color adjustment check box 410 to the "on" state, for instance. In the case where the printing is executed in the state set as described above, the color conversion processing unit 209 executes the color conversion in accordance with the set values by using a color adjustment module installed in the color conversion processing unit 209. This makes it possible to adjust the colors in the print product. Here, colors such as "cyan", "magenta", and "yellow" are also adjustable in addition to the "brightness" and the "contrast". In this regard, the configuration is not limited only to the example shown in FIG. 4. Incidentally, in the case where the check box for the color adjustment check box 410 is off, the setting of the brightness adjustment control item 411 and the contrast adjustment control item 412 is invalid and the color adjustment does not take place.

The OK button 413 is a button for closing the print setting screen 400 after transmitting the print setting set on the print setting screen 400 as the set values to the application 202. The cancel button 414 is a button for closing the print setting screen 400 without reflecting the print setting set on the print setting screen 400 as the set values.

<Processing by Printer Driver after Starting Printing>

Figure 5:
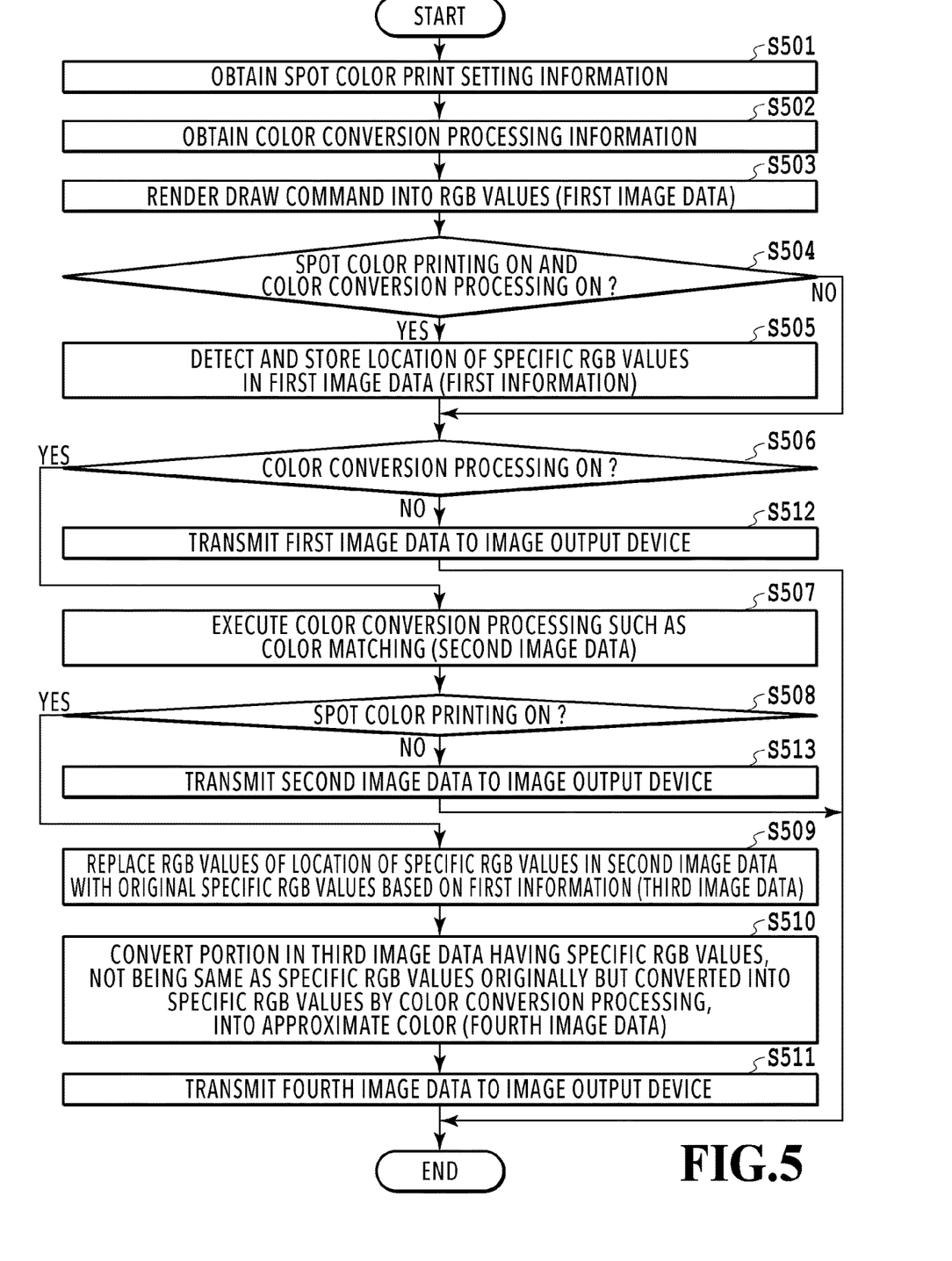
FIG. 5 is a flowchart showing processing procedures by a printer driver of a first embodiment.

FIG. 5 is a flowchart showing processing procedures to be executed by the graphics processing unit 205 of the printer driver 203 (FIG. 2) in the case where the application 202 instructs execution of the printing. An example in which print data shown in FIG. 6A and setting information on the print setting shown in FIG. 4 are sent from the application 202 and the printer driver 203 serving as an obtaining unit obtains the data and the information will be discussed in the following description. The print data in FIG. 6A includes text objects 601, 602, and 603, and graphic objects 604 and 605. Values of colors of the respective objects are defined as values shown in a table of FIG. 7A.

Here, the series of processing shown in FIG. 5 is carried out by causing the CPU 111 of the host computer 101 to load program codes stored in the ROM 112 into the external storage device 114 and to execute the program codes. Alternatively, part or all of the functions of the steps in FIG. 5 may be realized by hardware such as an ASIC and an electronic circuit. Note that code S prefixed to each step number in flowcharts of the present specification stands for a step.

First, in S501, the spot color processing unit 206 (FIG. 2) obtains spot color print setting information. Here, execution or non-execution of the spot color printing is determined from the setting of the check boxes 404 and 405 dedicated for the spot color printing (FIG. 4) out of the print setting information such as DEVMODE included in the print data. Moreover, color information on specific RGB values (R=255, G=0, and B=255 for fluorescent pink) corresponding to the spot color printing is obtained from model information on the printer driver 203 at the same time. Here, the color information on the specific RGB values may be obtained from the image output device 102 through a network cable or the like, or may be values determined as fixed values. Hence, the method of obtaining the specific RGB values is not limited to a particular method. The following description will be made on the assumption that only the check box 404 dedicated for the fluorescent pink spot color printing is set. Nonetheless, both the check box 404 dedicated for the fluorescent pink spot color printing and the check box 405 dedicated for the fluorescent orange spot color printing may be set at the same time. In that case, the entire processing to determine the RGB values to follow will be carried out based on the specific RGB values for the two colors of fluorescent pink and fluorescent orange.

Next, in S502, the spot color processing unit 206 obtains color conversion processing information from the print setting information such as DEVMODE included in the print data. The setting information on the color matching or the color adjustment is obtained as the color conversion processing information, and execution or non-execution of these color conversion processing procedures is determined.

Next, in S503, the rendering unit 207 (rendering means) 207 performs processing to convert draw commands included in the print data into the RGB values (rendering) by using a rendering engine installed in the OS or the rendering unit 207. As a consequence of this processing, the draw commands of the objects 601 to 605 shown in FIGS. 6A to 6F are converted into a piece of an RGB image (hereinafter referred to as first image data).

Next, in S504, the spot color processing unit 206 checks whether or not both of a spot color printing designation and a color conversion processing designation are used at the same time (whether or not the spot color printing is on and the color conversion processing is also on) based on the information obtained as a consequence of the processing in S501 and S502. Here, the processing goes to S505 in the case where both of the spot color printing designation and the color conversion processing designation are used at the same time, or goes to S506 in the case where these designations are not used at the same time. As a consequence of the processing in S504, it is possible to skip the processing in S505 to be described below in the case where the spot color printing designation and the color conversion processing designation are not used at the same time. Since the processing in S505 requires a lot of time, skipping this processing can reduce a phenomenon of a needless delay.

In S505, the spot color processing unit 206 detects a location of the image data having the specific RGB values (which are R=255, G=0, and B=255 in this example) from the first image data, and temporarily stores information indicating the detected location as first information in the data storage unit 208. The processing goes to S506 after this procedure by the spot color processing unit 206 serving as a detection unit. The method of detecting the image data having the specific RGB values from the first image data is thought to be a method of scanning all the rendered RGB images, setting a color or a bit flag only to the RGB values that match the specific RGB values, and then saving the corresponding RGB image in a different image format, for example. Meanwhile, the spot color processing unit 206 may detect the image data having the specific RGB values simultaneously with the rendering processing in S503, and the first information may be saved as a different image. Alternatively, the first information may be retained in such a way as to be embedded in the first image data instead of saving the first information as a different image. In the present embodiment, the location corresponding to the object 601 is detected as shown in FIG. 6B and is saved as the first information.

Next, in S506, the graphics processing unit 205 checks execution or non-execution of the color conversion processing based on the color conversion processing information obtained in S502. As a consequence, the processing goes to S507 in the case where the color conversion processing is designated, or the processing goes to S512 in the case where the color conversion processing is not designated. In S512, the graphics processing unit 205 converts the first image data into a data format interpretable by the image output device 102. Thereafter, the graphics processing unit 205 transmits the converted data to the image output device 102 through the communication unit 210, and terminates the processing.

Figure 6C:
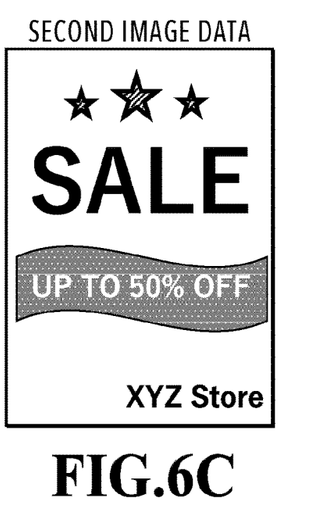
Figure 7A:
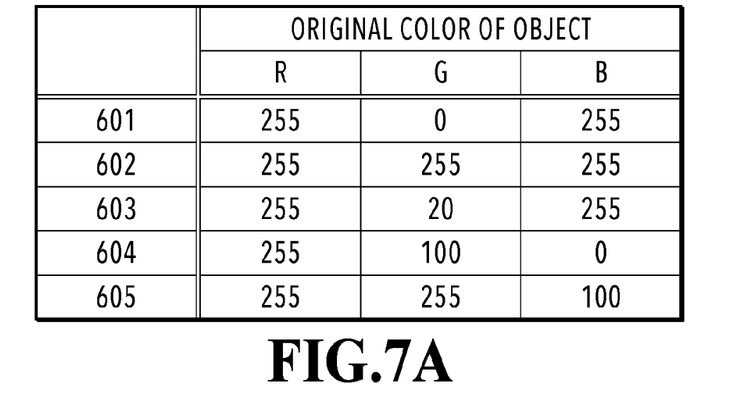
FIGS. 7A to 7C are tables showing colors of respective objects included in the print data.
Figure 7B:
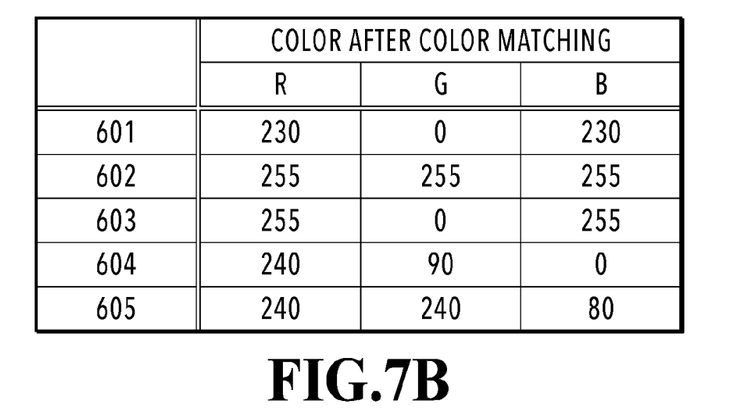

In S507, the color conversion processing unit 209 executes the color conversion processing such as the color matching and the color adjustment. FIG. 6C is a diagram showing an example of an image (hereinafter referred to as second image data) obtained after the color conversion processing unit 209 executes the color conversion processing as a first color conversion unit. In the image shown in FIG. 6C, colors of the locations corresponding to the original objects 601 to 605 are converted into colors shown in FIG. 7B.

Next, in S508, the spot color processing unit 206 checks whether or not the spot color printing is designated based on the result in S501. Then, the processing goes to S509 in the case where the spot color printing is designated, or goes to S513 in the case where the spot color printing is not designated. In S513, the graphics processing unit 205 converts the second image data into a data format interpretable by the image output device 102. Thereafter, the graphics processing unit 205 transmits the converted data to the image output device 102 through the communication unit 210, and terminates the processing.

Figure 6D:
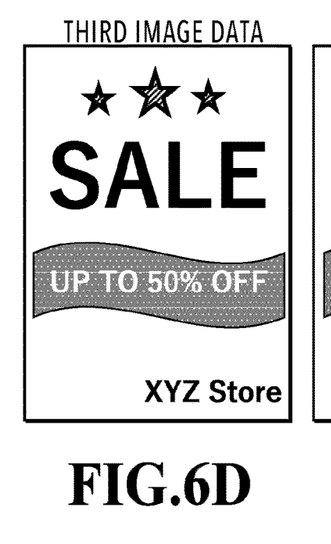
Figure 7C:
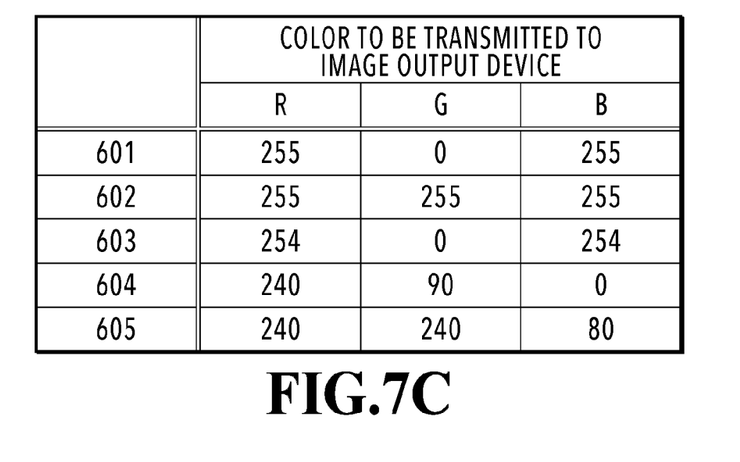

In S509, the spot color processing unit 206 replaces the RGB values of a location to carry out the spot color printing (the location of the object 601) in the second image data that undergoes execution of the color conversion processing such as the color matching into the RGB values before the execution of the color conversion processing. In other words, the spot color processing unit 206 carries out processing as a second color conversion unit that performs replacement with the original specific RGB values. The location to carry out the spot color printing in the second image data is identified based on the first information. FIG. 6D shows an example of the image after execution of the processing in S509 (hereinafter referred to as third image data). Meanwhile, FIG. 7C shows colors of the locations corresponding to the respective objects in the third image data. In the present embodiment, the color (R=230, G=0, and B=230) of the location of the text object 601 stating "SALE" after the color conversion processing such as the color matching are replaced with the original color (R=255, G=0, and B=255) of the text object. The processing in S509 makes it possible to correctly inform the image output device 102, which performs the printing of the specific RGB values with the spot color ink, of the location of the specific RGB values designated by the user in a state of removing an impact of the color conversion processing in advance.

Next, in S510, the spot color processing unit 206 detects a location from the third image data having the specific RGB values, which are not the same values in the original first image data but are converted into the relevant RGB values as a consequence of the color conversion processing. Then, the spot color processing unit 206 carries out processing as a third color conversion unit that replaces the RGB values of the detected location with those of an approximate color other than the color having the specific RGB values. For example, in the case where the location of the specific RGB values included in the third image data does not coincide with the location of the specific RGB values included in the first information, the RGB values of the location that does not coincide are replaced with the RGB values of the approximate color to the color having the specific RGB values. FIG. 6E shows an example of the image after the conversion into the approximate color (hereinafter referred to as fourth image data). Meanwhile, FIG. 7C also shows colors after the conversion into the approximate color. In the present embodiment, the color (R=255, G=0, and B=255) of the location of the text object 603 stating "XYZ Store" after the color matching are replaced with the approximate color having no specific RGB (R=254, G=0, and B=254).

The present embodiment describes the case of setting the specific RGB values to be printed in the spot color to R=255, G=0, and B=255 that represent a single color. However, the present invention is not limited only to this configuration. For example, the specific RGB values to be printed in the spot color may be defined as values with ranges such as R=250 to 255, G=0 to 5, and B=250 to 255. In this way, it is possible to reduce a phenomenon of deviation from the designation of the spot color printing due to a slight change in color in the course of the processing attributed to a print application, the OS, and the like.

In the case where the specific RGB values have certain ranges as in the above-mentioned example, a color which is approximate to the ranges is set as the approximate color in the processing in S510. For example, a color having the values R=249, G=0, and B=249 is set as the approximate color. According to the processing in S510, it is possible to keep the image output device 102, which is configured to print the specific RGB values with the spot color ink, from carrying out the spot color printing at an unintended location due to the impact of the color conversion processing. Although the present embodiment shows the example of creating the print data sequentially from the third image data to the fourth image data through the processing in S509 and S510, the print data of the fourth image data may be created by carrying out the processing in the S509 and the processing in S510 at the same time.

Next, in S511, the graphics processing unit 205 converts the print data of the fourth image data into a data format interpretable by the image output device 102. Thereafter, the graphics processing unit 205 transmits the converted data to the image output device 102 through the communication unit 210, and terminates the processing. Then, the image output device 102 that receives the print data from the host computer 101 executes a printing operation, thus forming an image (FIG. 6F) by ejecting the spot color ink to the location of the specific RGB values.

The above-described processing makes it possible to use the color matching technique and the color adjustment technique, which bring about the color conversion, in the spot color printing in accordance with a general application that uses the specific RGB values. Moreover, according to the present embodiment, it is always possible to designate the location of the spot color printing for the image output device by using the information on the RGB values only regardless of the presence or absence of the color conversion processing. Thus, the entire printing system can be simply configured. For example, even in the case of inputting data from a portable terminal or a USB memory which cannot perform the color conversion processing and the like, the image output device can always execute the spot color printing based on the color information on the specific RGB values.

The present invention shows the example of causing the printer driver 203 to execute the entire processing from S501 to S510. Instead, it is also possible to cause the application 202 or the image output device 102 to execute the processing from S501 to S510. Meanwhile, the execution of the processing from S501 to S510 may be shared by two or more modules. For example, in the case of causing the image output device 102 to execute the rendering and color conversion processing, the image output device 102 may carry out the processing from S501 to S510 based on the print data received from the printer driver 203. In the meantime, it is also possible to adopt a mode of causing the application 202 to execute the processing from S501 to S510 and causing the printer driver 203 to carry out only the data transmission to the image output device 102.

Meanwhile, the present embodiment is configured to determine the location to designate the spot color printing after the rendering, and then to carry out the color conversion processing, and is therefore compatible with various modes of the printing systems. For example, depending on the printing system, there may be a case where data on all of the draw commands are transmitted in a rendered state at a point before the processing by the printer driver due to restrictions of the OS and the like, or a case where a variety of processing can be executed only after the rendering. In these cases, the information on the specific RGB values will be lost if the color conversion processing is executed on a rendered image in advance. Hence, it is not possible to carry out the spot color printing properly. In contrast, according to the present embodiment, the information on the location of the specific RGB values is temporarily saved after the rendering. Thus, it is possible to prevent the information on the location of the specific RGB values from being lost in the course of the subsequent color conversion processing. Hence, the present embodiment is compatible with various modes of the printing system. In the case where it is possible to create the first information by analyzing the draw commands before the rendering, the first information may be created in advance and the rendering and the color conversion processing may be carried out. Thereafter, the RGB values of the location to carry out the spot color printing may be replaced with the specific RGB values based on the first information.

Second Embodiment

Next, a second embodiment of the present invention will be described with reference to FIGS. 8 and 9. The first embodiment describes the example of correctly informing the image output device 102 of the location of the specific RGB values designated by the user by transmitting the data of the RGB values modified in advance to the image output device that prints the specific RGB values with the spot color ink. On the other hand, the second embodiment is configured to transmit the first information indicating the location of the specific RGB values to the image output device 102, and to cause the image output device 102 to carry out proper spot color printing while removing the impact of the color conversion processing based on the first information. Note that features of the processing which are different from the first embodiment will be mainly discussed in the following description, and overlapping explanations concerning the same configuration and processing as those of the first embodiment will be omitted.

Figure 6A:
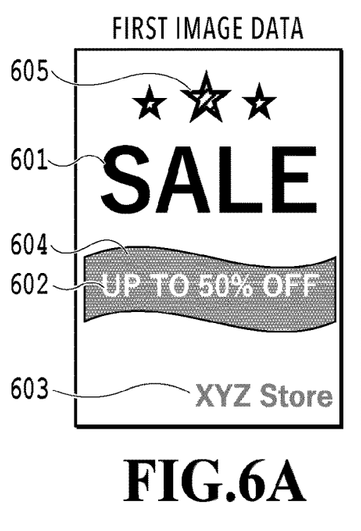
FIGS. 6A to 6F are diagrams showing various results of processing print data.
Figure 6B:
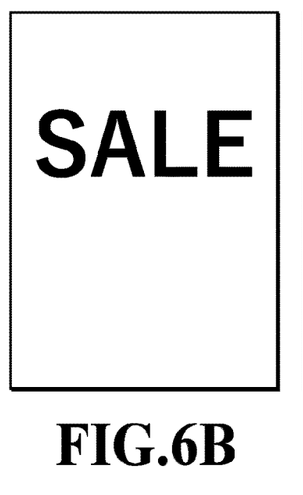
Figure 6E:
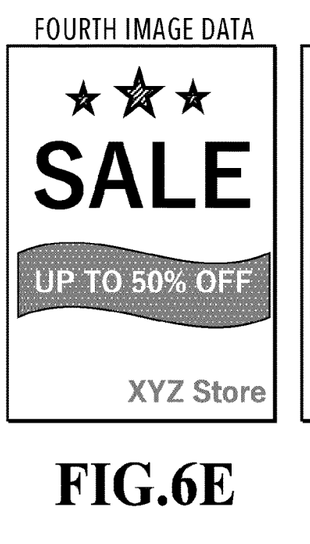
Figure 6F:
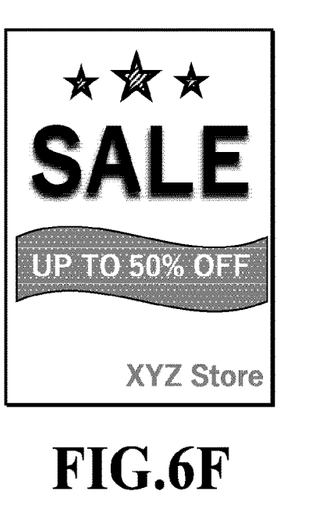

The present embodiment will also be described on the assumption that the print data in FIG. 6A and the print setting shown in FIG. 4 are transmitted as the print data from the application 202 as with the first embodiment.

Figure 8:
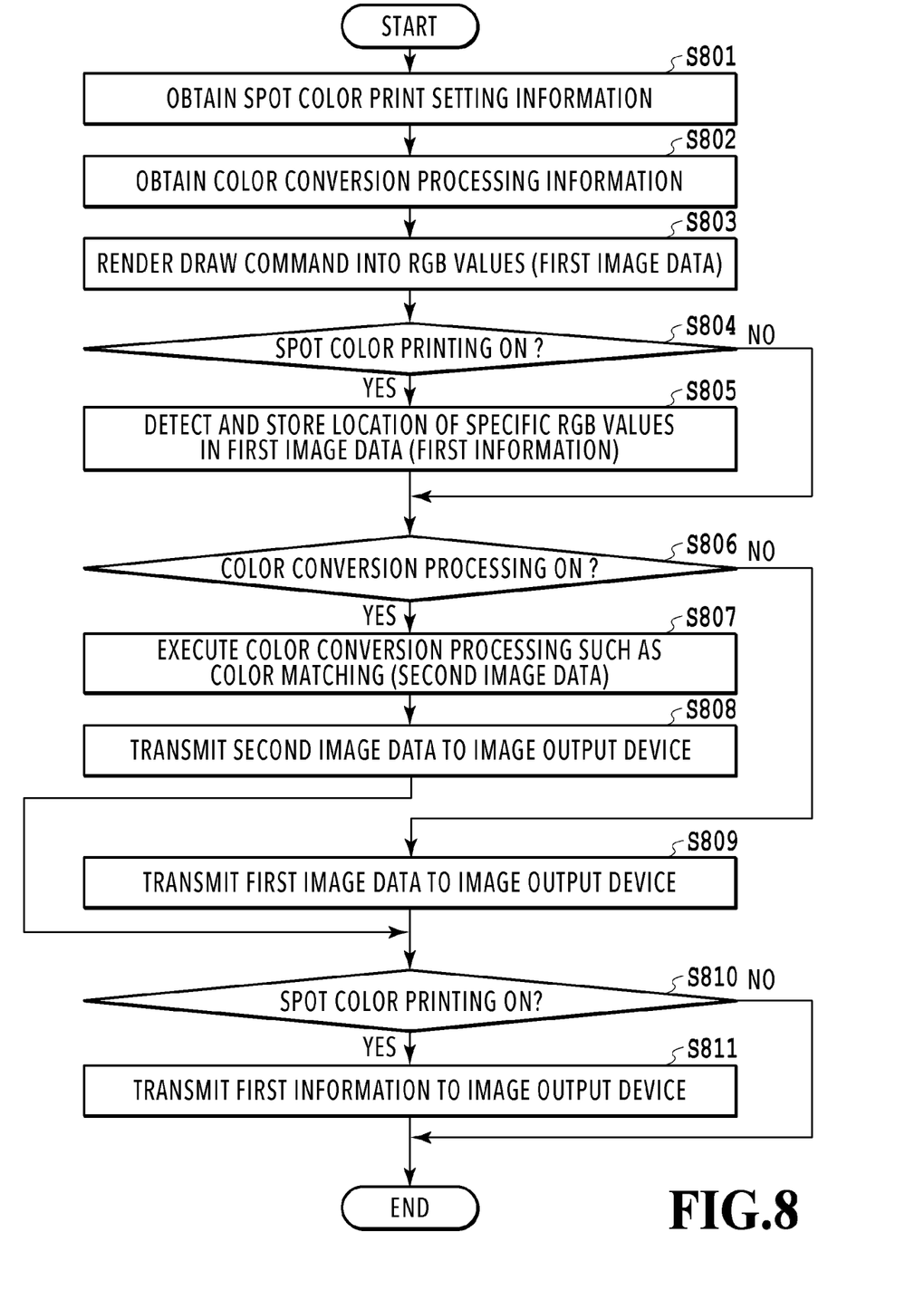
FIG. 8 is a flowchart showing processing procedures by a printer driver of a second embodiment.

FIG. 8 is a flowchart showing processing procedures to be executed by the graphics processing unit 205 of the printer driver 203 (FIG. 2) in the case where the application 202 instructs execution of the printing. The series of processing shown in FIG. 8 is carried out by causing the CPU 111 of the host computer 101 to load program codes stored in the ROM 112 into the external storage device 114 and to execute the program codes. Alternatively, part or all of the functions of the steps in FIG. 8 may be realized by hardware such as an ASIC and an electronic circuit. In FIG. 8, details of the processing shown in S801, S802, and S803 are the same as the details of the processing shown in S501, S502, S503 illustrated in FIG. 5, and explanations of the details of the above-mentioned processing will be omitted herein.

In S804, the spot color processing unit 206 checks whether or not the spot color printing is designated (whether or not the spot color printing is on) based on the information obtained as a consequence of the processing in S801. Here, the processing goes to S805 in the case where the spot color printing is designated, or goes to S806 in the case where the spot color printing is not designated. In S805, the location of the image data having the specific RGB values is detected from the rendered first image data, and the first information indicating the detected location is temporarily stored in the data storage unit 208 as with S505 shown in FIG. 5. Meanwhile, in S806, execution or non-execution of the color conversion processing is determined regarding the first image data as with S506 shown in FIG. 5. The processing goes to S809 in the case where the color conversion processing is not carried out, or the processing goes to S807 in the case where the color conversion processing is carried out.

In S807, the color conversion processing unit 209 executes the color conversion processing such as the color matching to create the print data for the second image data, and then the processing goes to S808. In S808, the graphics processing unit 205 converts the second image data into the data format interpretable by the image output device 102. Thereafter, the graphics processing unit 205 transmits the converted data to the image output device 102 through the communication unit 210. Meanwhile, in S809, the graphics processing unit 205 converts the first image data into the data format interpretable by the image output device 102. Thereafter, the graphics processing unit 205 transmits the converted data to the image output device 102 through the communication unit 210.

In S810, the spot color processing unit 206 checks the presence of the spot color printing designation from a result of the processing in S801. Here, the processing goes to S811 in the case where the spot color printing is designated, or terminates the processing in the case where the spot color printing is not designated. In S811, the graphics processing unit 205 converts the first information into the data format interpretable by the image output device 102. Thereafter, the graphics processing unit 205 transmits the converted data to the image output device 102 through the communication unit 210. Here, the processing in S811 may be carried out simultaneously with S808 or S809. There is no particular order of carrying out these steps.

Figure 9:
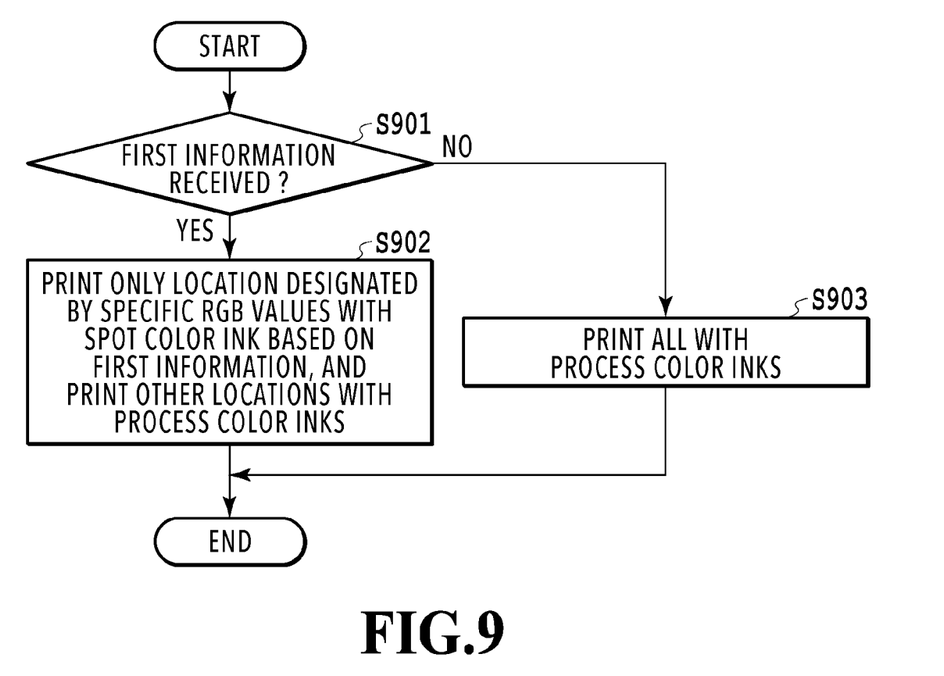
FIG. 9 is a flowchart showing processing procedures by an image output device of the second embodiment.

FIG. 9 is a flowchart showing processing to be carried out by a not-illustrated CPU provided to the image output device 102 after receiving the print data transmitted from the printer driver 203 of the host computer 101. In S901, the CPU of the image output device 102 checks whether or not the print data is received from the printer driver 203 together with the first information. Here, the CPU of the image output device 102 moves the processing to S902 in the case where the print data is received together with the first information, or moves the processing to S903 in the case where the first information is not received. In S902, the CPU of the image output device 102 detects a location to be printed with the spot color ink based on the first information, and executes the printing only on the relevant location by using the spot color ink. Meanwhile, other locations are printed in the process colors by using the ordinary inks of the CMYK colors and the like without using any spot color inks. Then, the processing is terminated. In S903, the printing with the process color is executed on all the locations of the image data by using the ordinary inks without using any spot color inks. Then, the processing is terminated.

As described above, according to the present embodiment, the image output device 102 prints the location in the image data having the specific RGB values by using the spot color ink, and prints other locations by using the ordinary inks based on the first information transmitted from the printer driver 203. In this way, it is possible to use the spot color printing and the color conversion processing such as the color matching at the same time without causing the printer driver 203 to carry out replacement of the colors. As a consequence, it is possible to achieve the processing faster without having to carry out the color replacement processing in S509 of the first embodiment. Moreover, even if the pixels having the RGB values that coincide with the specific RGB values come into being at a location other than a location supposed to be subjected to the spot color printing, the pixels can be formed by using the ordinary inks without any spot color inks. Hence, the conversion processing into the approximate color in S510 of the first embodiment also becomes unnecessary. For this reason, the pixels at the location other than the location supposed to be subjected to the spot color printing are kept from being converted from the color subjected to the color conversion processing into the approximate color. Thus, it is possible to form the pixels with the color set by the color conversion processing. In addition, the processing is also speeded up as a consequence of curtailing the processing in S510.

Other Embodiments

The first embodiment has described the example of turning the color information corresponding to the location having the specific RGB values in the first image data subjected to the color conversion processing back to the color information indicating the specific color before carrying out the color conversion processing, and causing the image output device 102 to carry out the spot color printing based on the latter color information. Meanwhile, the second embodiment has described the example of transmitting the first information that indicates the location supposed to be subjected to the spot color printing to the image output device 102, and causing the image output device 102 to carry out the spot color printing at the specific position indicated in the first information. It is also possible to carry out the processing of the first embodiment and the processing of the second embodiment while switching the procedures depending on the functions of the image output device 102 used therein. Specifically, the host computer 101 takes over the functions of the image output device 102 and carries out the processing shown in FIGS. 8 and 9 in the case where the image output device has the functions with which it is possible to carry out the spot color printing based on the first information. On the other hand, in the case where the image output device 102 is configured to carry out the spot color printing based only on the RGB values, the image output device 102 executes the processing shown in FIG. 5. As described above, the host computer 101 may be configured to determine the functions of the image output device 102 to be used, and to carry out the processing in accordance with the functions.

In the above-described embodiments, the ink jet printer configured to form images by ejecting the inks has been described as the example of the image output device 102 serving as a printing unit. However, the present invention is not limited only to this configuration. The present invention is also applicable to an image forming apparatus configured to execute printing by using coloring materials other than the inks, such as an electrophotographic image forming apparatus that executes printing by using coloring materials such as toners.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-076106, filed Apr. 28, 2021 which is hereby incorporated by reference herein in its entirety.

What is claimed is:

1. A control method for an apparatus configured to control print data for executing printing by using a first color being a process color and a second color being a specific color different from the process color, comprising:
obtaining color information to be printed in the specific color out of color information included in the print data;
detecting a specific location to be printed in the specific color based on the obtained color information in an image;
performing first color conversion to subject the color information included in the print data to color conversion processing in accordance with a color conversion instruction; and
performing second color conversion on image data subjected to the color conversion processing in performing the first color conversion, in such a way as to turn color information corresponding to the specific location back to color information indicating the specific color before the color conversion processing is performed in performing the first color conversion, wherein
a printing unit configured to execute printing based on the print data executes the printing on the specific location by using the second color based on the color information indicating the specific color turned back in performing the second color conversion and executes the printing on a location other than the specific location by using the first color based on color information after the color conversion in performing the first color conversion.

2. The control method according to claim 1, wherein the detecting is performed by detecting the specific location based on image data created by rendering based on a draw command included in the print data, or based on the draw command.

3. The control method according to claim 2, wherein
the rendering creates the image data including a pixel having RGB values based on the draw command, and
the detecting detects a location of the pixel having the RGB values being the color information obtained in the obtaining.

4. The control method according to claim 1, further comprising:
performing third color conversion in a case where color information corresponding to the location other than the specific location is converted into color information identical to the color information indicating the specific color by the color conversion processing in performing the first color conversion, to replace the converted color information with color information indicating an approximate color to color corresponding to the converted color information, wherein
the printing unit executes the printing by using the first color based on the color information indicating the approximate color.

5. The control method according to claim 1, wherein
in a case where the color conversion instruction is not present and the print instruction for using the specific color is present, the printing unit executes the printing on the location other than the specific location by using the first color based on the color information not subjected to the color conversion processing in performing the first color conversion, and executes the printing on the specific location by using the second color based on the color information indicating the specific color.

6. The control method according to claim 1, wherein
in a case where the color conversion instruction is present and the print instruction for using the specific color is not present, the printing unit executes the printing by using the first color based on the color information subjected to the color conversion processing in performing the first color conversion.

7. The control method according to claim 1, wherein the printing unit is provided to the apparatus.

8. The control method according to claim 1, wherein
the apparatus is an information processing apparatus, and
the printing unit is provided to an image output device configured to receive the print data from the information processing apparatus.

9. The control method according to claim 8, wherein the obtaining, the detecting, and performing the first color conversion is executed by a prescribed program in the information processing apparatus.

10. The control method according to claim 9, wherein the prescribed program is a printer driver.

11. The control method according to claim 9, wherein the prescribed program is an application program.

12. The control method according to claim 1, wherein
the first color is a color to be printed by using a first coloring material representing the process color without using a second coloring material being a coloring material of the specific color, and
the second color is a color to be printed by using at least the second coloring material.

13. The control method according to claim 12, wherein
the first coloring material is at least one coloring material among a cyan coloring material, a magenta coloring material, a yellow coloring material, and a black coloring material, and
the second coloring material is at least one coloring material among a fluorescent pink coloring material, a fluorescent orange coloring material, a violet coloring material, a green coloring material, an orange coloring material, and a coloring material of a metallic color.

14. The control method according to claim 1, wherein the printing unit executes the printing on a print medium by ejecting an ink.

15. A printing apparatus configured to execute printing by using a first color being a process color and a second color being a specific color different from the process color, comprising:
an obtaining unit configured to obtain color information to be printed in the specific color out of color information included in print data;
a detection unit configured to detect a specific location to be printed in the specific color based on the obtained color information in an image;
a first color conversion unit configured to subject the color information included in the print data to color conversion processing in accordance with a color conversion instruction;
a second color conversion unit configured to convert image data subjected to the color conversion processing in performing the first color conversion, in such a way as to turn color information corresponding to the specific location back to color information indicating the specific color before the color conversion processing is performed in performing the first color conversion, and
a printing unit configured to execute the printing on the specific location by using a second coloring material based on the color information indicating the specific color turned back in performing the second color conversion and to execute the printing on a location other than the specific location by using a first coloring material based on color information after the color conversion by the first color conversion unit.

16. A non-transitory computer readable storage medium storing a program to be executed by a computer to implement a printing method of executing printing by using a first color being a process color and a second color being a specific color different from the process color, the printing method comprising:
obtaining color information to be printed in the specific color out of color information included in print data;
detecting a specific location to be printed in the specific color based on the obtained color information in an image;
performing first color conversion to subject the color information included in the print data to color conversion processing in accordance with a color conversion instruction;
performing second color conversion on image data subjected to the color conversion processing in performing the first color conversion, in such a way as to turn color information corresponding to the specific location back to color information indicating the specific color before the color conversion processing is performed in performing the first color conversion, and
printing on the specific location by using the second color based on the color information indicating the specific color turned back in performing the second color conversion, and printing on a location other than the specific location by using the first color based on color information after the color conversion by performing the first color conversion.

* * * * *